(12) United States Patent
Kai

(10) Patent No.: US 7,828,327 B2
(45) Date of Patent: Nov. 9, 2010

(54) AIRBAG APPARATUS

(75) Inventor: Takeshi Kai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 12/195,636

(22) Filed: Aug. 21, 2008

(65) Prior Publication Data

US 2009/0051144 A1 Feb. 26, 2009

(30) Foreign Application Priority Data

Aug. 24, 2007 (JP) ............................. 2007-219048

(51) Int. Cl.
*B60R 21/239* (2006.01)
(52) U.S. Cl. ........................ 280/739; 280/740; 280/742; 280/743.2
(58) Field of Classification Search ................ 280/739, 280/743.2, 742, 740
See application file for complete search history.

(56) References Cited

U.S. PATENT DOCUMENTS

| | | | | |
|---|---|---|---|---|
| 6,209,911 B1 * | 4/2001 | Igawa et al. | ................. | 280/740 |
| 6,736,425 B2 * | 5/2004 | Lemon et al. | ............... | 280/739 |
| 2004/0026911 A1 * | 2/2004 | Kreuzer | ....................... | 280/739 |
| 2005/0073139 A1 * | 4/2005 | Fischer et al. | ............... | 280/740 |
| 2007/0024039 A1 * | 2/2007 | Kai et al. | ..................... | 280/739 |

FOREIGN PATENT DOCUMENTS

| | | | |
|---|---|---|---|
| JP | 06-107099 | | 4/1994 |
| JP | 2000-043674 A | * | 2/2000 |
| JP | 2001-097159 A | * | 4/2001 |

\* cited by examiner

*Primary Examiner*—Ruth Ilan
(74) *Attorney, Agent, or Firm*—Rankin, Hill & Clark LLP

(57) ABSTRACT

An airbag apparatus includes a tether interconnecting a front fabric of an airbag and an inflator to retain the airbag in an occupant restraining deployed configuration. Back fabric of the airbag has an opening portion for discharging gas, ejected from the inflator into the airbag, to outside the airbag. A fabric member that has an outward peripheral portion greater in size than the opening portion of the back fabric is mounted to the inflator, and the fabric member is disposed within the airbag.

4 Claims, 17 Drawing Sheets

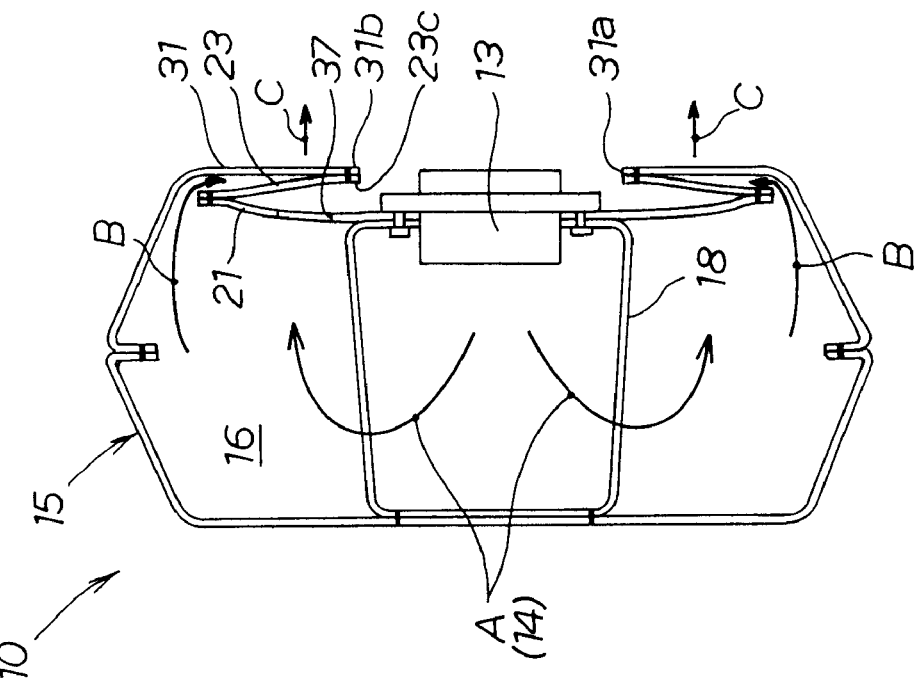
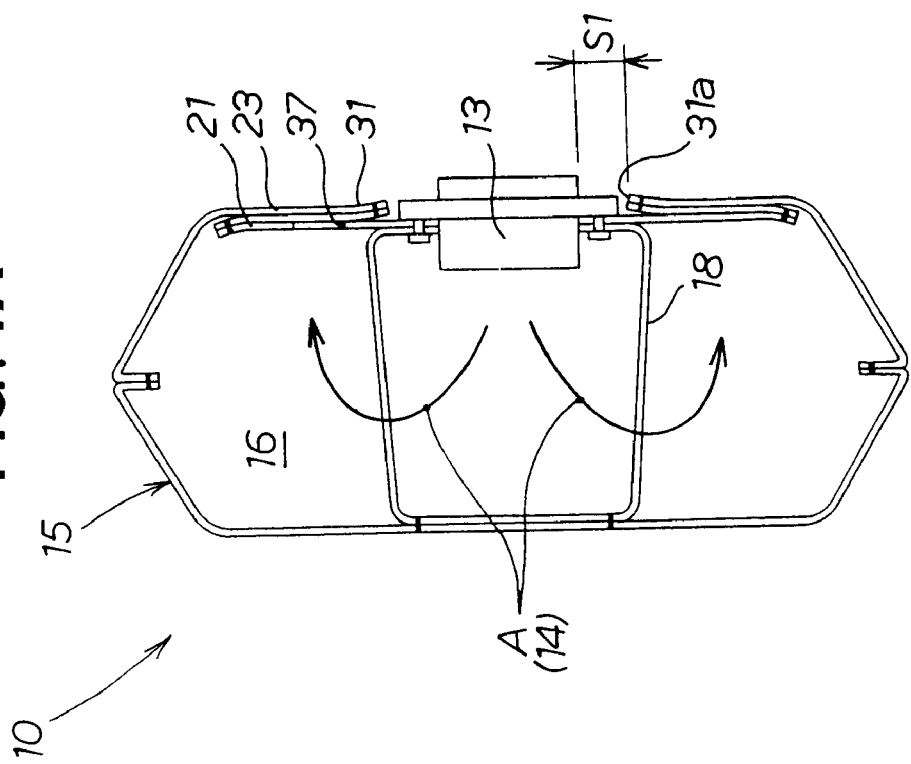

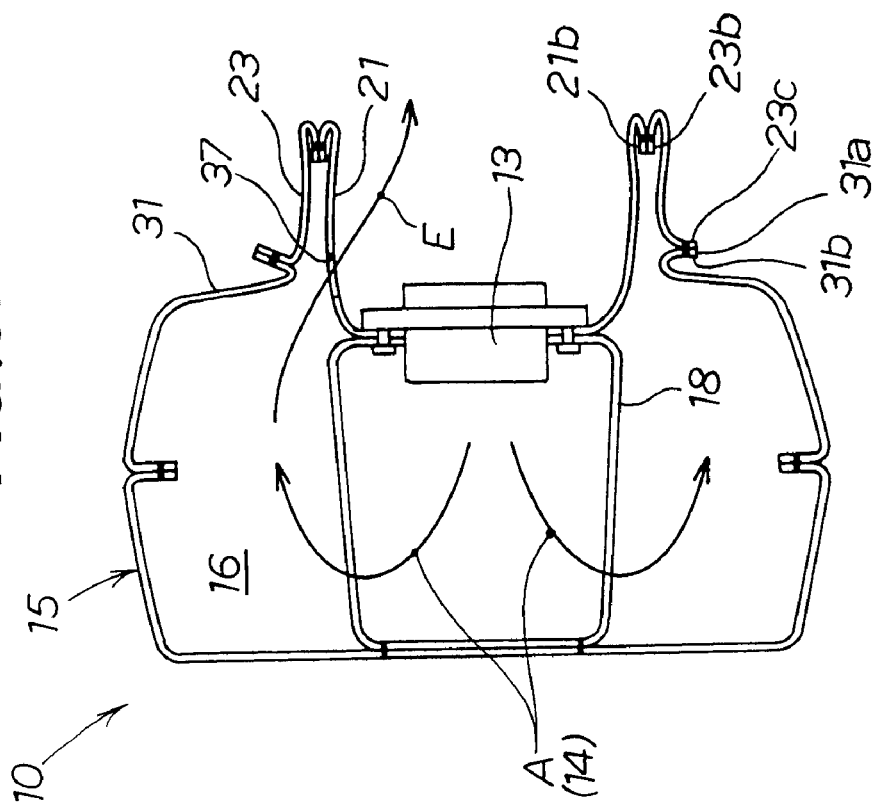
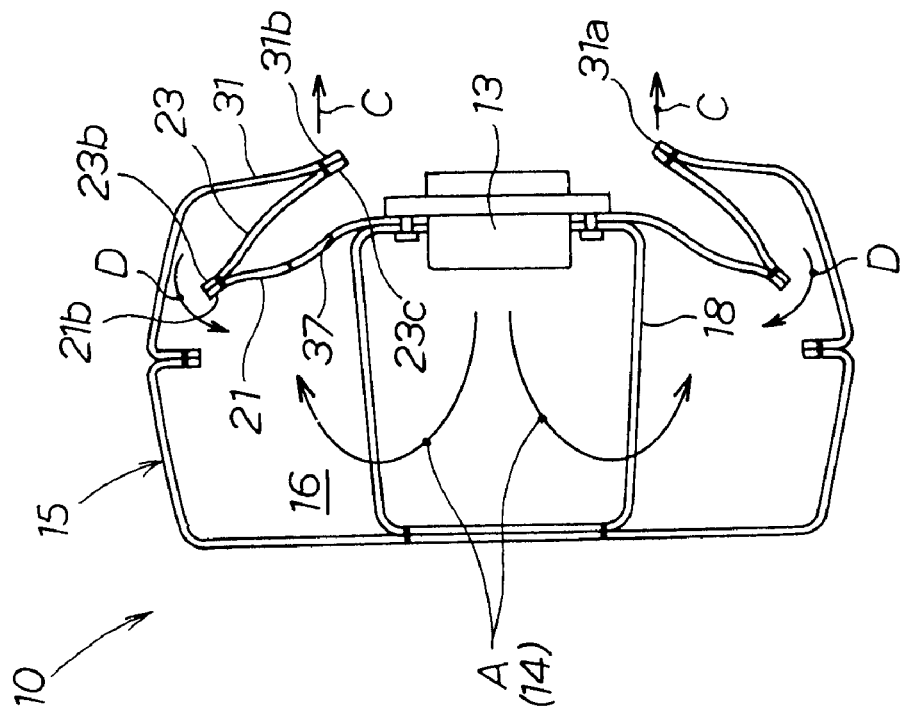

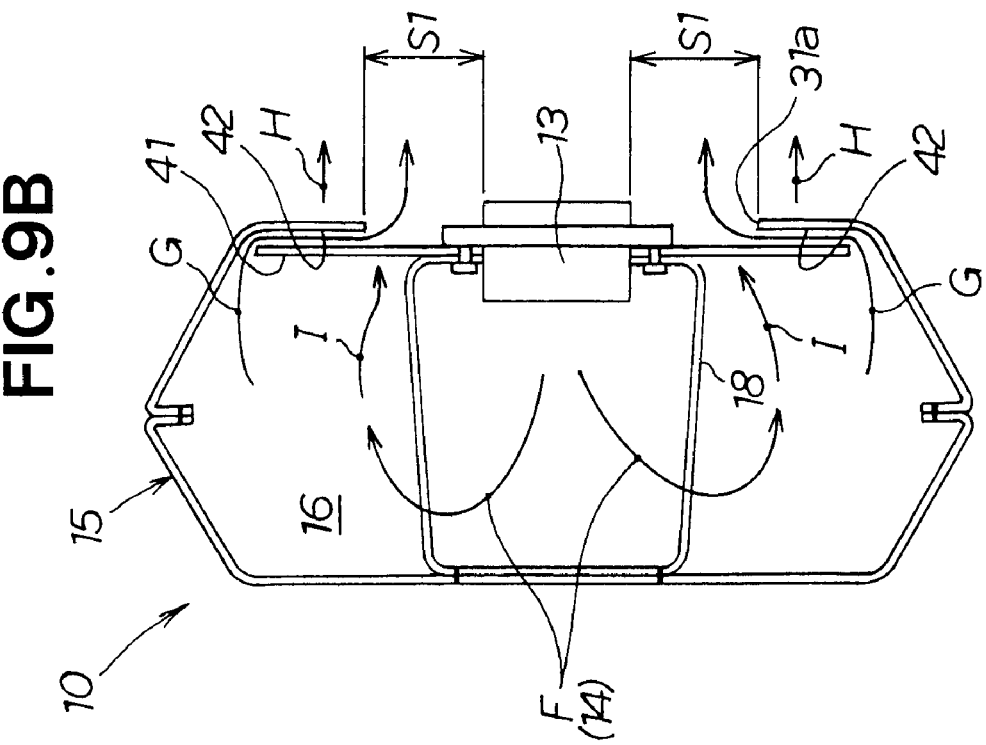
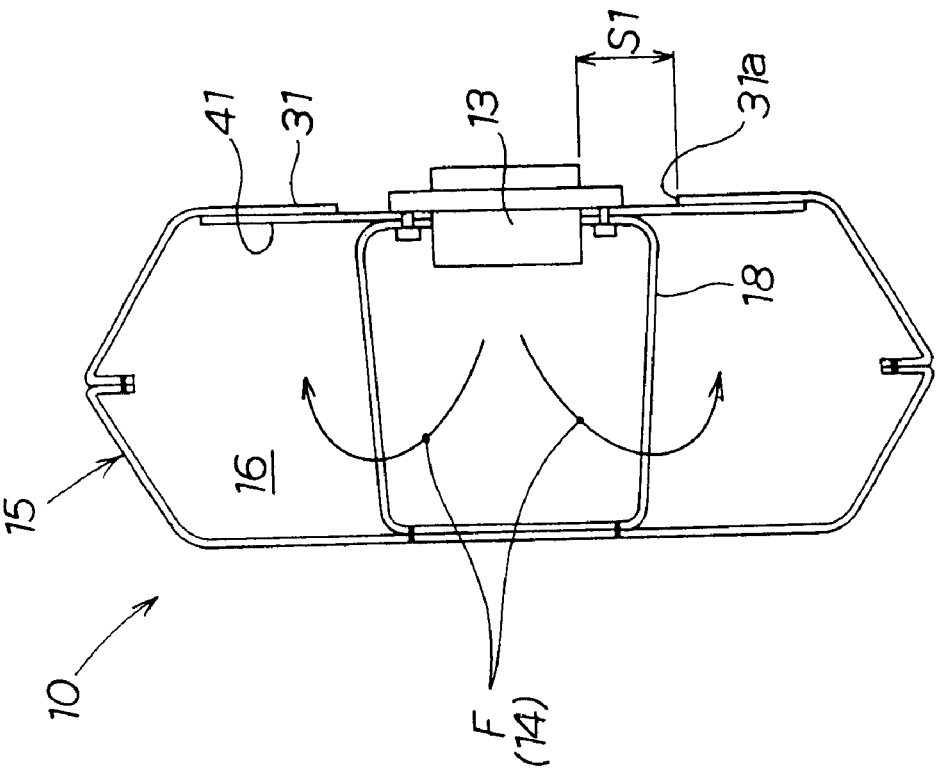

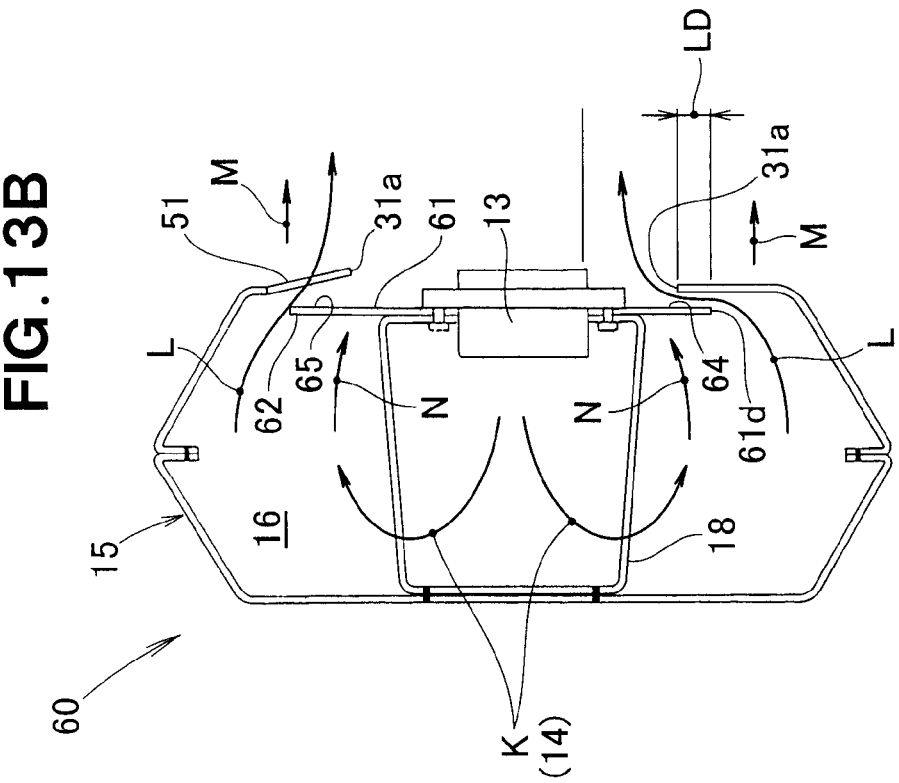
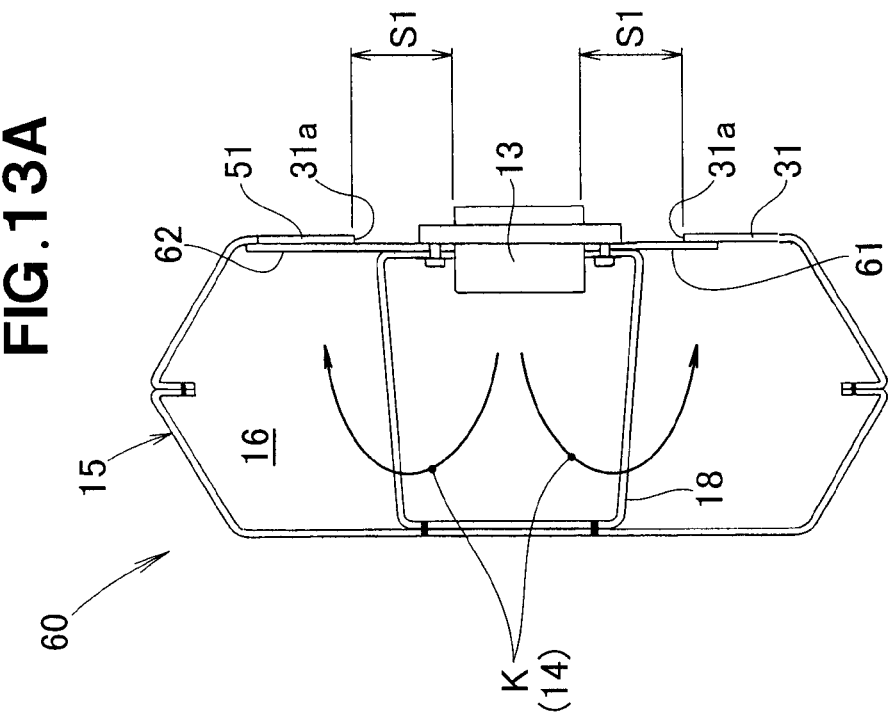

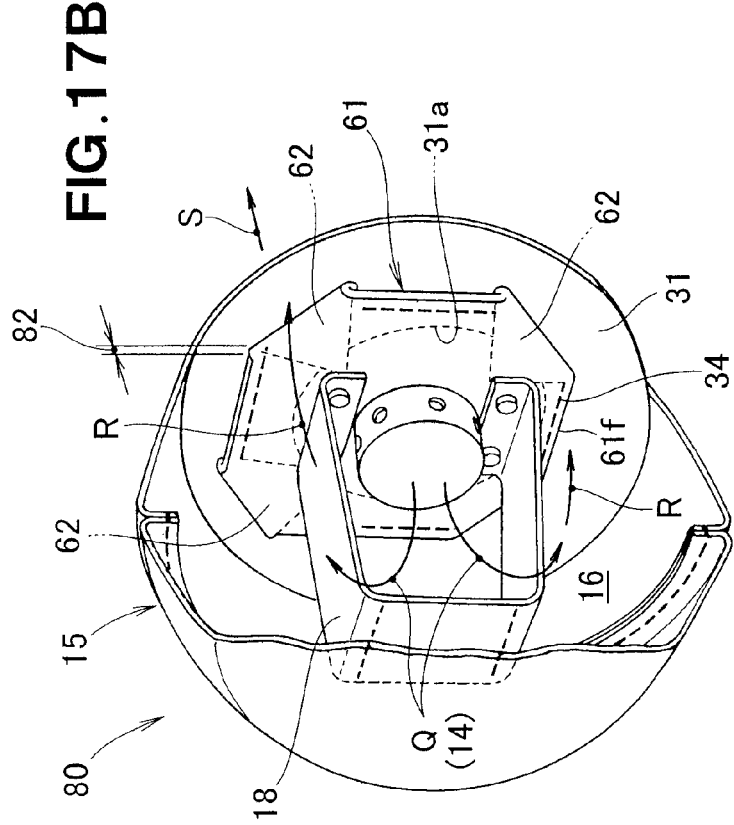
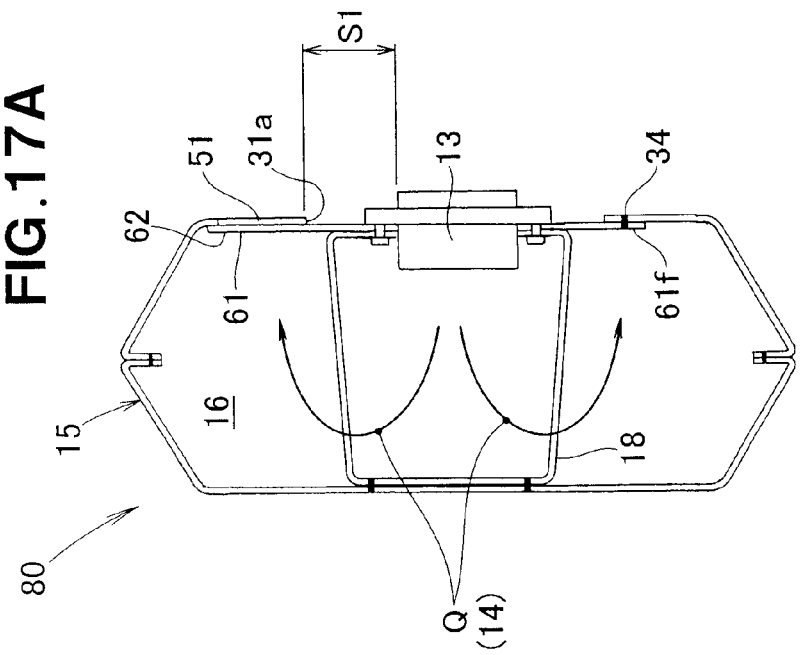

AIRBAG APPARATUS

FIELD OF THE INVENTION

The present invention relates to airbag apparatus which have an airbag formed by sewing together front and back (i.e., outer and inner) fabrics and inflatable by a gas pressure of an inflator, and in which the front fabric is disposed closer to and in oppose relation to a vehicle occupant while the back fabric is disposed remote from or opposite from the vehicle occupant.

BACKGROUND OF THE INVENTION

Among the conventionally-known airbag apparatus are ones in which a strap (hereinafter referred to as "tether") for retaining an airbag in a deployed configuration capable of protectively holding or restraining a vehicle occupant is provided within the airbag, the airbag has a vent hole formed therein, the tether is provisionally joined to an inner surface portion of the airbag around the vent hole with the airbag kept in a folded configuration, the provisional joint is released immediately before the airbag is deployed to protectively restrain the vehicle occupant (see, for example, Japanese Patent Application Laid-Open Publication No. HEI-6-107099).

In the airbag apparatus disclosed in the HEI-6-107099 publication, the tether is kept provisionally joined to the inner surface of the airbag around the vent hole until immediately before the airbag is deployed, by gas ejected from the inflator, into a configuration capable of protectively restraining the vehicle occupant. Thus, the vent hole is kept closed with the tether until immediately before the airbag is deployed. Hereinafter, the sufficiently deployed configuration of the airbag, which is capable of protectively restraining the vehicle occupant, will be referred to as "occupant restraining configuration". Namely, with the airbag apparatus disclosed in the HEI-6-107099 publication, the airbag can be deployed without the gas escaping from the airbag until immediately before the airbag is deployed to the occupant restraining configuration.

Once the airbag is deployed almost to the occupant restraining configuration, the tether is pulled strongly by the airbag so that the provisional joint is canceled. Then, the tether is taken off the inner surface portion of the airbag around the vent hole, so that the vent hole is opened. By causing the gas to escape through the opened vent hole, the inner pressure of the airbag can be adjusted appropriately.

However, because the vent hole is opened immediately before the airbag is deployed to the occupant restraining configuration, the airbag apparatus disclosed in the HEI-6-107099 publication would present the inconvenience that the gas undesirably escapes through the vent hole before the airbag is deployed to the occupant restraining configuration and thus it is difficult to deploy the airbag efficiently and stably. Consequently, with the disclosed airbag apparatus, it is necessary to increase the amount of the gas generated by the inflator to some degree.

SUMMARY OF THE INVENTION

In view of the foregoing prior art problems, it is an object of the present invention to provide an improved airbag apparatus which can deploy an airbag efficiently and stably and can minimize an amount of gas to be generated by an inflator.

In order to accomplish the above-mentioned object, the present invention provides an improved airbag apparatus, which comprises: an airbag deployable by a pressure of gas ejected from an inflator upon collision of a vehicle, the airbag including front and back fabrics interconnected along the respective peripheries thereof into a bag shape. The front fabric being disposed closer to and in opposed relation to a vehicle occupant. The back fabric having an opening portion for discharging the gas, ejected from the inflator, to outside the airbag. The inflator being disposed in the opening portion of the back fabric. The airbag apparatus further including a tether interconnecting the front fabric and the inflator and a fabric member mounted to the inflator in face-to-face relation thereto and having an outward peripheral portion greater in size than the opening portion of the back fabric. The fabric member being disposed within the airbag.

In the airbag apparatus of the present invention, the front fabric is positioned closer to and in opposed relation to the vehicle occupant, while the back fabric is positioned remote or opposite from the vehicle occupant. Further, the back fabric has the opening portion for discharging the gas to outside the airbag, and the fabric member, having the outward peripheral portion greater in size than the opening portion of the back fabric, is mounted to the inflator. Thus, when the airbag is to be deployed by the inflator ejecting the gas into the airbag, the fabric member is pressed against and superposed on the back fabric by the gas pressure applied to the airbag, so that the opening portion can be kept closed with the fabric member. In this way, the inventive airbag apparatus can deploy the airbag to the configuration capable of appropriately restraining the vehicle occupant (namely, "occupant restraining configuration") while effectively preventing the gas from escaping from the interior of the airbag through the opening portion.

The gas continues to be ejected into the airbag even after the deployment, to the occupant restraining configuration, of the airbag, and thus, the gas pressure in the airbag increases. With the increased gas pressure, the fabric member is pushed out of the airbag through the opening portion, which forms a gap between the fabric and the opening portion. Thus, the gas in the airbag is discharged through the formed gap, so that the gas pressure in the airbag can be adjusted appropriately. In this way, the airbag apparatus of the present invention can prevent the gas from escaping out of the airbag by keeping the opening portion closed until the airbag has taken the occupant restraining configuration. As a result, the airbag can be deployed to the occupant restraining configuration efficiently and stably, and thus, the amount of the gas to be generated by the inflator can be minimized.

Preferably, the airbag apparatus of the invention further comprises a connecting fabric connected not only to the outward peripheral portion of the fabric member, but also to an inward peripheral edge portion of the back fabric defining the opening portion, and the fabric member has a vent hole formed therein. The fabric member and the connecting fabric protrude out of the airbag through the opening portion following the deployment of the airbag, at which time the gas in the airbag is discharged to outside the airbag via the vent hole. Thus, the amount of the gas discharged from the airbag can be adjusted through the vent hole. As a result, the gas pressure in the interior of the airbag can be adjusted with ease.

Alternatively, only the fabric member may protrude out of the airbag through the opening portion following the deployment of the airbag.

Preferably, part of the fabric member is connected to the back fabric. Thus, only part of the fabric member can be caused to protrude out of the airbag through the opening portion. Sewing part of the fabric member to the back fabric like this permits adjustment of the amount of the gas discharged from the airbag, so that the gas pressure in the airbag can be adjusted with ease.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIGS. 4A and 4B are views explanatory of how the airbag is deployed to the occupant restraining configuration in the first embodiment of the airbag apparatus;

FIGS. 5A and 5B are views explanatory of how a gas pressure in the airbag is adjusted in the first embodiment of the airbag apparatus;

FIGS. 9A and 9B are views explanatory of how the air bag is deployed to the occupant restraining configuration in the second embodiment of the airbag apparatus;

FIGS. 13A and 13B are views explanatory of how the airbag is deployed to the occupant restraining configuration in the fourth embodiment of the airbag apparatus;

FIGS. 17A and 17B are views explanatory of how the airbag is deployed to the occupant restraining configuration in the sixth embodiment of the airbag apparatus.

DETAILED DESCRIPTION OF THE PREFERRED EMBODIMENTS

Figure 1:
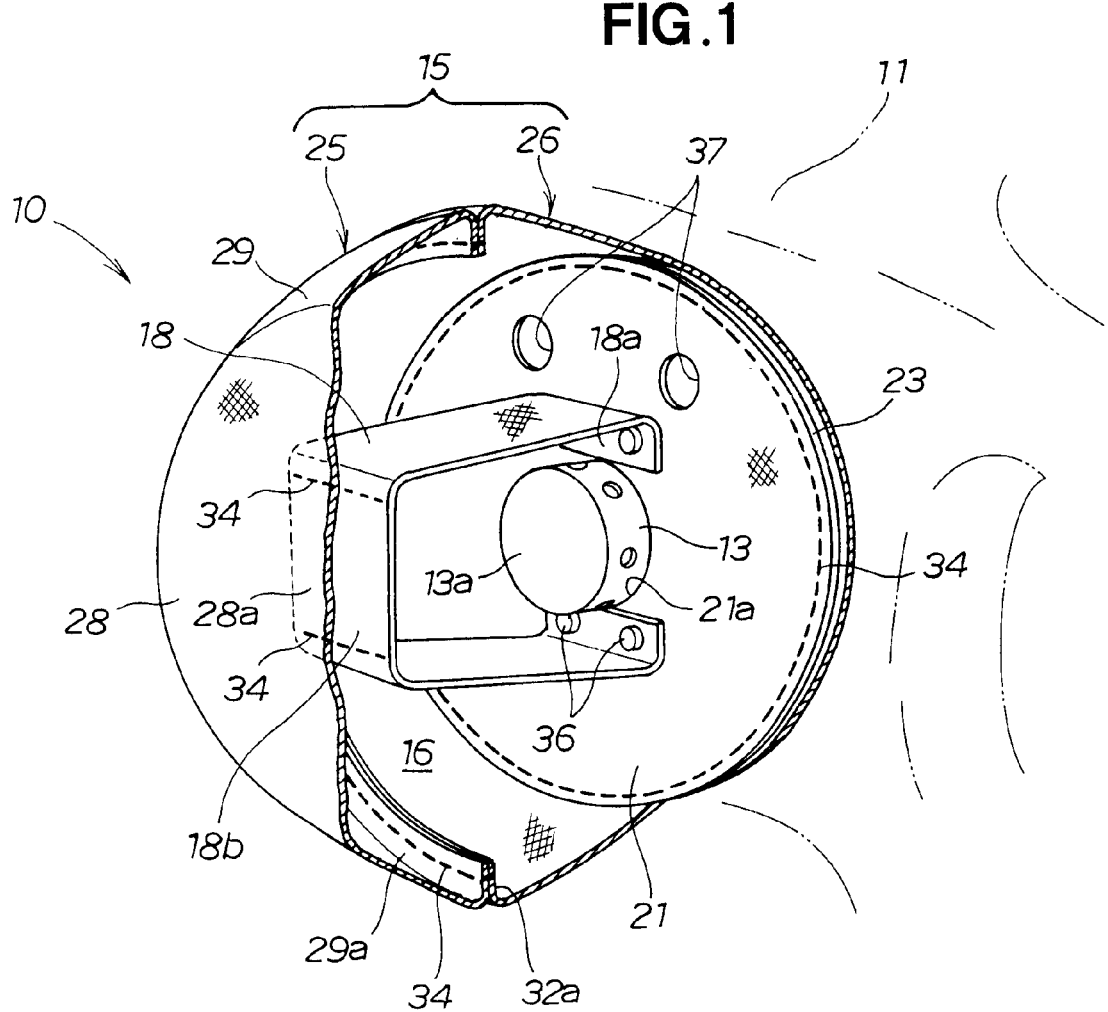
FIG. 1 is a perspective view showing a first embodiment of an airbag apparatus of the present invention with its airbag deployed to an occupant restraining configuration.

FIG. 1 is a perspective view showing a first embodiment of an airbag apparatus 10 of the present invention with its airbag 15 deployed to an occupant restraining configuration. This airbag apparatus 10 is provided within a steering wheel 11 of a vehicle. Once an impact acts on the vehicle due to a collision, the airbag is deployed to the front of a vehicle driver or passenger (hereinafter referred to as "vehicle occupant") to restrain and protect the vehicle occupant.

The airbag apparatus 10 includes an inflator 13 for generating gas 14 (see FIG. 4), the airbag 15 deployable by the gas ejected from the inflator 13, a tether 18 for retaining the airbag 15 in the occupant restraining configuration, a fabric member 21 provided within the airbag 15, and a connecting fabric 23 for connecting the fabric member 21 to the airbag 15.

Figure 2:
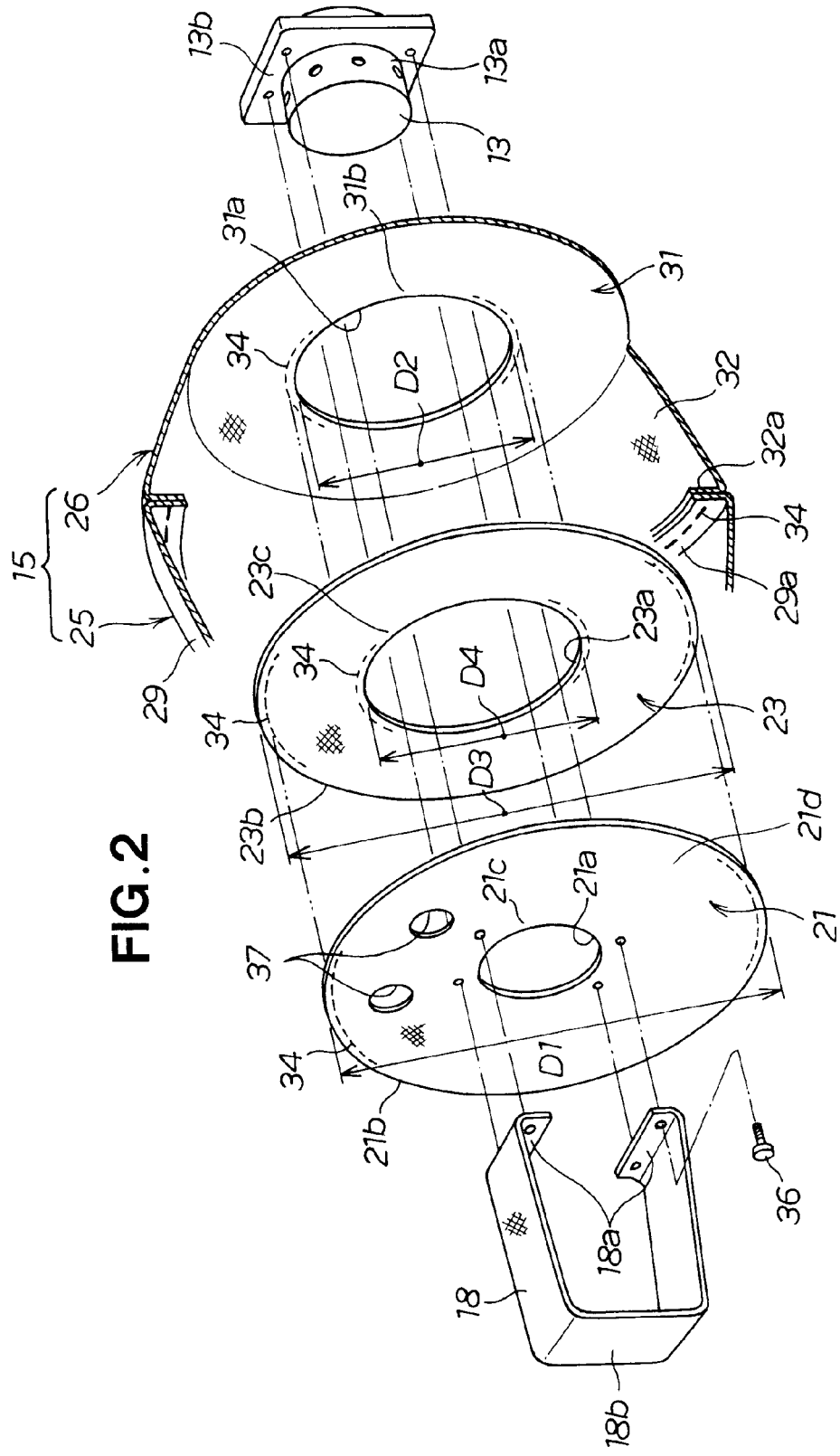
FIG. 2 is an exploded perspective view showing the first embodiment of the airbag apparatus with the airbag deployed to the occupant restraining configuration.
Figure 3:
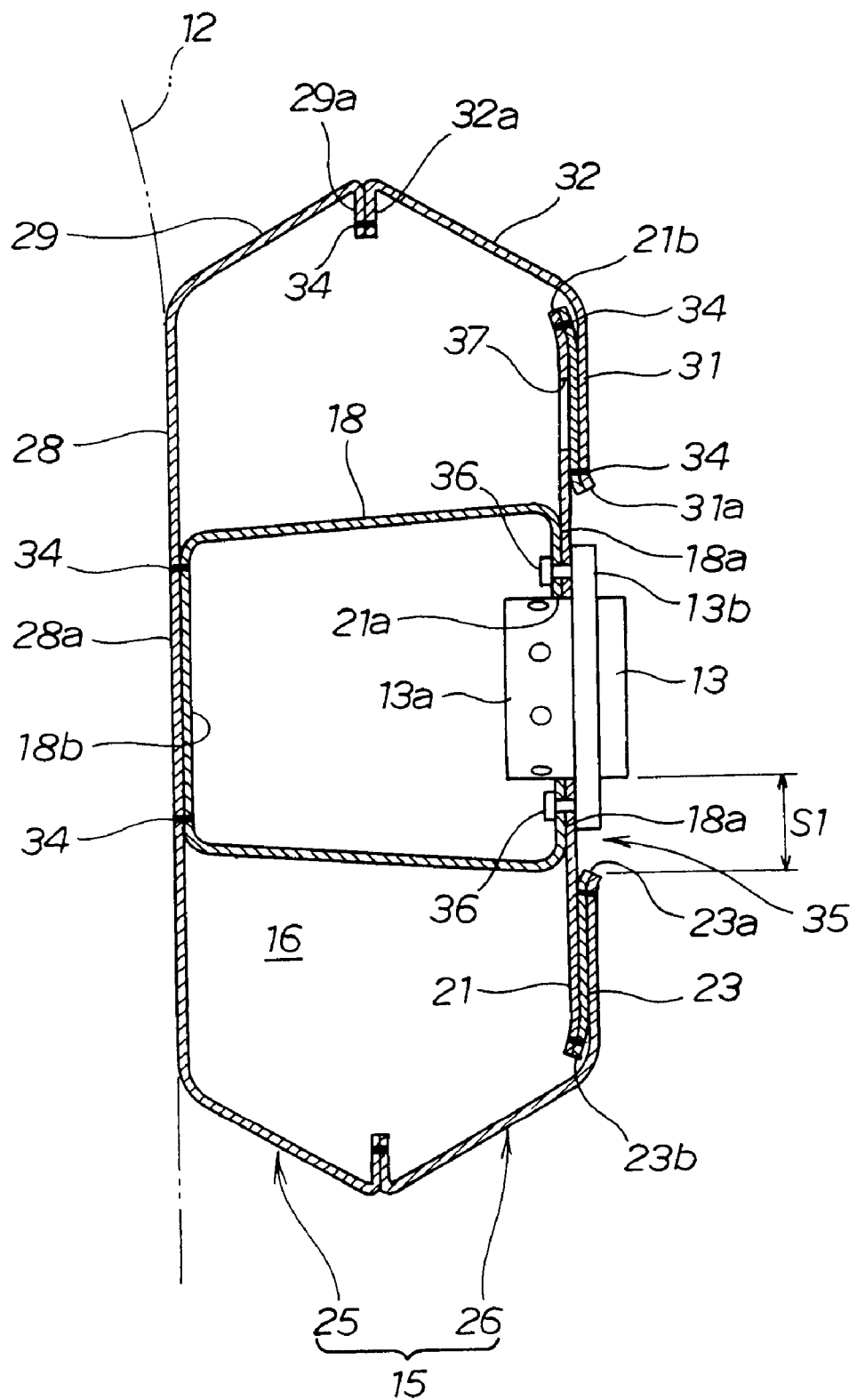
FIG. 3 is a sectional view showing the first embodiment of the airbag apparatus with the airbag deployed to the occupant restraining configuration.

FIGS. 2 and 3 are an exploded perspective view and a sectional view, respectively, showing the first embodiment of the airbag apparatus 10 with the airbag 15 deployed to the occupant restraining configuration.

The inflator 13, which is provided within the steering wheel 11, is a gas supply section that ejects the gas 14 into an interior 16 of the airbag 15 once the vehicle collides with an external object, such as another vehicle or pedestrian. The airbag 15 is a bag deployable by the gas 14 supplied from the inflator 13 into the interior 16.

The airbag 15 includes an front fabric 25 disposed closer to and in opposed relation to the vehicle occupant 12, and an back fabric disposed remote from or opposite from the vehicle occupant 12. The front fabric 25 includes an front fabric body 28 of a circular shape disposed to oppose to the vehicle occupant 12, and a peripheral wall 29 provided on the outward periphery of the front fabric body 28.

The back fabric 26 includes an back fabric body 31 of an annular or ring shape disposed opposite from the vehicle occupant 12, and a peripheral wall 32 provided on the outward periphery of the back fabric body 31. The back fabric body 31 has an opening portion 31a formed centrally therein for discharging the gas 14, ejected from the inflator 16 into the interior 16 of the airbag 15, to outside the airbag 15.

Respective radially-outward peripheral portions 29a and 32a of the peripheral walls 29 and 32 of the front and back fabrics 29 and 32 are sewn together with a sewing thread 34, to provide the airbag 15 of a predetermined shape. The airbag 15 is kept fitted over the inflator 13 in its deployed configuration with a predetermined gap S1 left between the edge of the opening portion 31a of the back fabric body 31 and the inflator 13. Thus, a discharge port 35 is formed by the opening portion 31a of the back fabric body 31 and the inflator 13.

The fabric member 21 is an annular or ring-shaped fabric having a circular outward periphery 21b and a circular fitting opening portion 21a formed centrally therein. The fitting opening portion 21a is fittable over a distal end portion 13a of the inflator 13.

The fabric member 21 has a diameter D1 greater than a diameter D2 of the opening portion 31a of the back fabric body 31. Namely, the fabric member 21 has an outward peripheral portion 21d greater in size than the opening portion 31a of the back fabric body 31. The fabric member 21 is secured to a flange 13b of the inflator 13 by means of screws or bolts 36 with the fitting opening portion 21a fitted over the inflator 13. Under the aforementioned condition, the fabric member 21 is positioned within the airbag 15 and near the back fabric body 31.

The fabric member 21 has a pair of vent holes 37 formed therein to direct the gas 14 (see FIG. 4), ejected from the inflator 13 to the interior 16 of the airbag 15, toward the opening portion 31a of the back fabric body 31.

The connecting fabric 23 is provided between the fabric member 21 and the back fabric body 31. The connecting fabric 23 is an annular fabric having a circular outward periphery 23b and a circular opening portion 23a formed centrally therein.

The connecting fabric 23 has a diameter D3 substantially corresponding to the circular outward periphery 21b of the fabric member 21, and an outward peripheral portion of the connecting fabric 23 adjacent to the circular outward periphery 23b is sewn, with the sewing thread 34, to an outward peripheral portion 21d of the fabric member 21 adjacent to the circular outward periphery 21b.

Further, the opening portion 23a of the connecting fabric 23 has a diameter D4 substantially equal to a diameter of the opening portion 31a of the back fabric body 31, and the opening portion 23a has an inward peripheral portion 23c sewn to an inward peripheral edge portion 31b of the opening portion 31a of the back fabric body 31.

Namely, the connecting fabric 23 is an annular fabric that interconnects the outward peripheral portion 21d (adjacent the outward periphery 21b) of the fabric member 21 and the inward peripheral edge portion 31b of the opening portion 31a of the back fabric body 31. The predetermined gap S1 between the opening portion 31a of the back fabric body 31 and the inflator 13 can be closed by the outward periphery 21b of the fabric member 21 and the inward peripheral portion of the opening portion 31a being interconnected via the connecting fabric 23. Further, the connecting fabric 23 closes the vent holes 37 of the fabric member 21 by being superposed on the fabric member 21.

The tether 18 is provided in the interior 16 of the airbag 15, and it is a cloth-made strap or belt. The tether 18 is formed into a loop shape by being secured at its opposite ends 18a, to the flange 13b of the inflator 13 together with an inward peripheral portion 21c of the fabric member 21 by means of the screws or bolts 36, and it has a middle portion 18b sewn to a middle portion 28a of the back fabric body 28 by means of the sewing thread 34.

Thus, the back fabric body 28 and the inflator 13 are interconnected by the tether 18, so that the airbag 15 can be kept in the occupant restraining configuration capable of appropriately restrain the vehicle occupant 12.

The following paragraphs describe an example manner in which the airbag 15 of the airbag apparatus 10 is deployed, with reference to FIGS. 4-5. FIGS. 4A and 4B are views explanatory of how the airbag is deployed to the occupant restraining configuration in the first embodiment of the airbag apparatus 10.

In FIG. 4A, the gas 14 is ejected or supplied from the inflator 13 to the interior 16 of the airbag 15, as indicated in arrow A, so that the airbag 15 starts to be deployed by the supplied gas 14.

In this state, the predetermined gap S1 between the opening portion 31a and the inflator 13 is still kept closed with the fabric member 21. Further, because the fabric member 21, connecting fabric 23 and back fabric body 31 are disposed in face-to-face superposed relation to one another, the vent holes 37 of the fabric member 21 are still kept closed with the connecting fabric 23.

With the predetermined gap S1 and vent holes 37 kept closed in the aforementioned manner, the gas 14 supplied from the inflator 13 to the interior 16 of the airbag 15 can be prevented from escaping out of the airbag 15. In this way, the airbag 15 can be efficiently deployed until it has taken the occupant restraining configuration capable of appropriately restraining the vehicle occupant 12 (i.e., the configuration illustrated in FIG. 4A).

In FIG. 4B, the gas 14 continues to be supplied into the airbag 15 having already been deployed to the occupant restraining configuration. With the gas 14 continuing to be supplied into the sufficiently deployed airbag 15, the gas pressure in the airbag 15 increases.

The thus-increased gas pressure acts on the back fabric body 31 as indicated by arrow B, so that the inward peripheral portion of the back fabric body 31 moves as indicated by arrow C. Also, the inward peripheral portion 23c of the connecting fabric 23 moves along with the inward peripheral edge portion 31b of the back fabric body 31 indicated by arrow C. Thus, the connecting fabric 23 gets away from the fabric member 21, so that the vent holes 37 are opened.

FIGS. 5A and 5B are views explanatory of how the gas pressure in the airbag 15 is adjusted in the first embodiment of the airbag apparatus 10. As seen in FIG. 5A, the gas 14 continues to be supplied into the airbag 15 even after the connecting fabric 23 gets away from the fabric member 21. Thus, the inward peripheral portion 23c of the connecting fabric 23 moves along with the inward peripheral edge portion 31b of the back fabric body 31 as indicated by arrow C. Simultaneously, the outward peripheral portion (adjacent the outward periphery 23b) of the connecting fabric 23 and the outward peripheral portion 21b of the fabric member 21 move as indicated by arrow D.

With the gas 14 continuing to be supplied into the airbag 15 as shown in FIG. 5B, the connecting fabric 23 and fabric member 21 are pushed out of the airbag 15 (i.e., protrude out of the airbag 15) through the opening portion 31a, so that the vent holes 37 are exposed out of the airbag 15.

Thus, the gas 14 in the interior 16 of the airbag 15 can be discharged to outside the airbag 15 through the vent holes 37 and hence the opening portion 31a, as indicated by arrow E.

Namely, in the instant embodiment, the gas 14 is discharged through the vent holes 37 instead of being discharged directly through the predetermined gap S1 defined between the opening portion 31a and the inflator 13. Thus, the discharged amount of the gas 14 can be adjusted by just changing the number and size of the vent holes 37. As a result, the gas pressure in the interior 16 of the airbag 15 can be adjusted with ease.

When the airbag 15 is to be deployed, the first embodiment of the airbag apparatus can prevent the gas 14 from escaping out of the airbag 15 by keeping the vent holes 37 closed until the airbag 15 has taken the occupant restraining configuration, as set forth above in relation to FIGS. 4A-5B. Consequently, the airbag 15 can be deployed to the occupant restraining configuration efficiently and stably, and thus, the amount of the gas 14 to be generated by the inflator 13 can be minimized.

Next, with reference to FIGS. 6-18, a description will be given about second to sixth embodiments of the airbag apparatus of the present invention. Similar elements to those in the first embodiment of the airbag apparatus 10 are indicated by the same reference numerals and characters as used for the first embodiment 10 and will not be described here to avoid unnecessary duplication.

Figure 6:
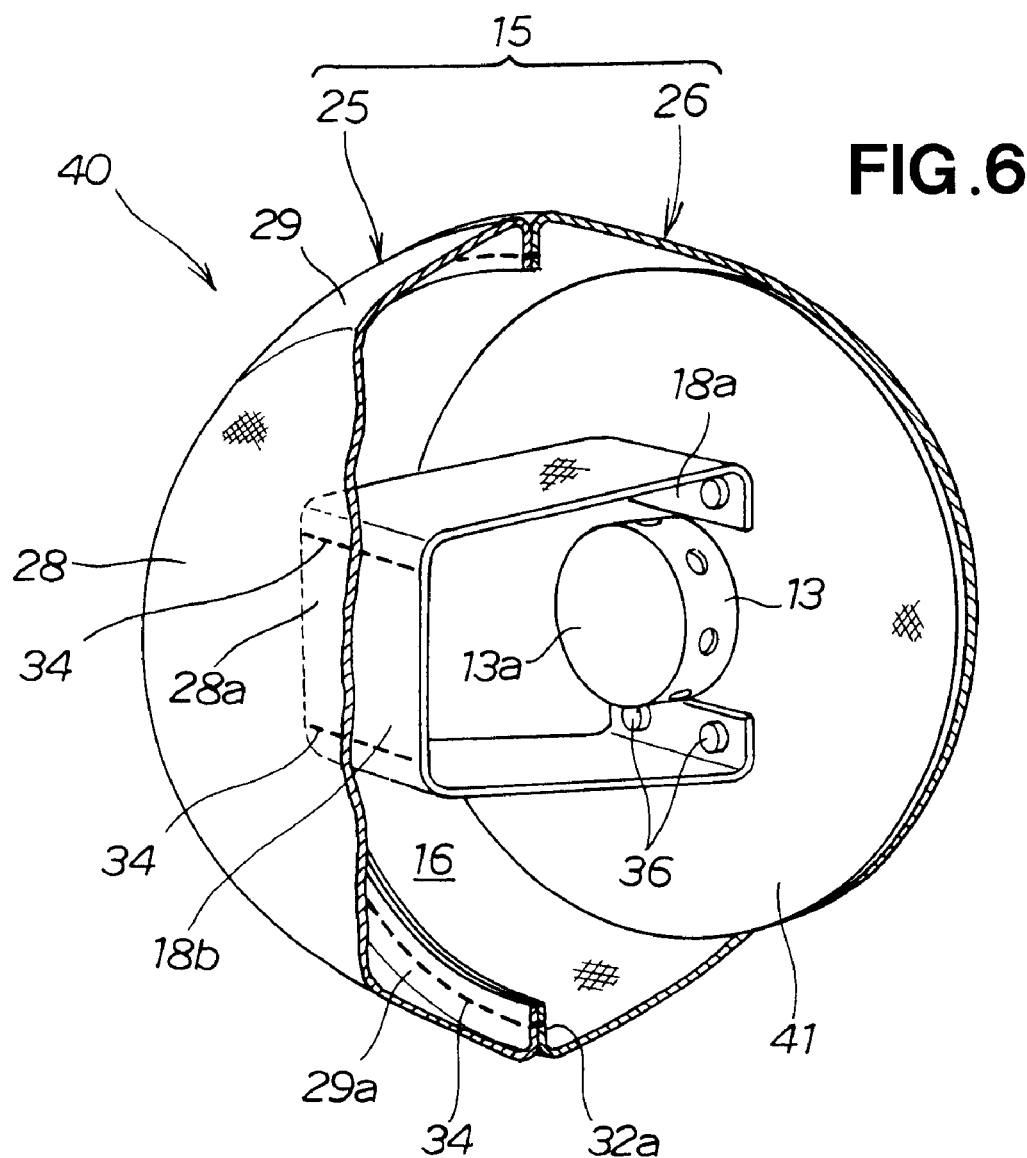
FIG. 6 is a perspective view showing a second embodiment of the airbag apparatus of the present invention with its airbag deployed to the occupant restraining configuration.
Figure 7:
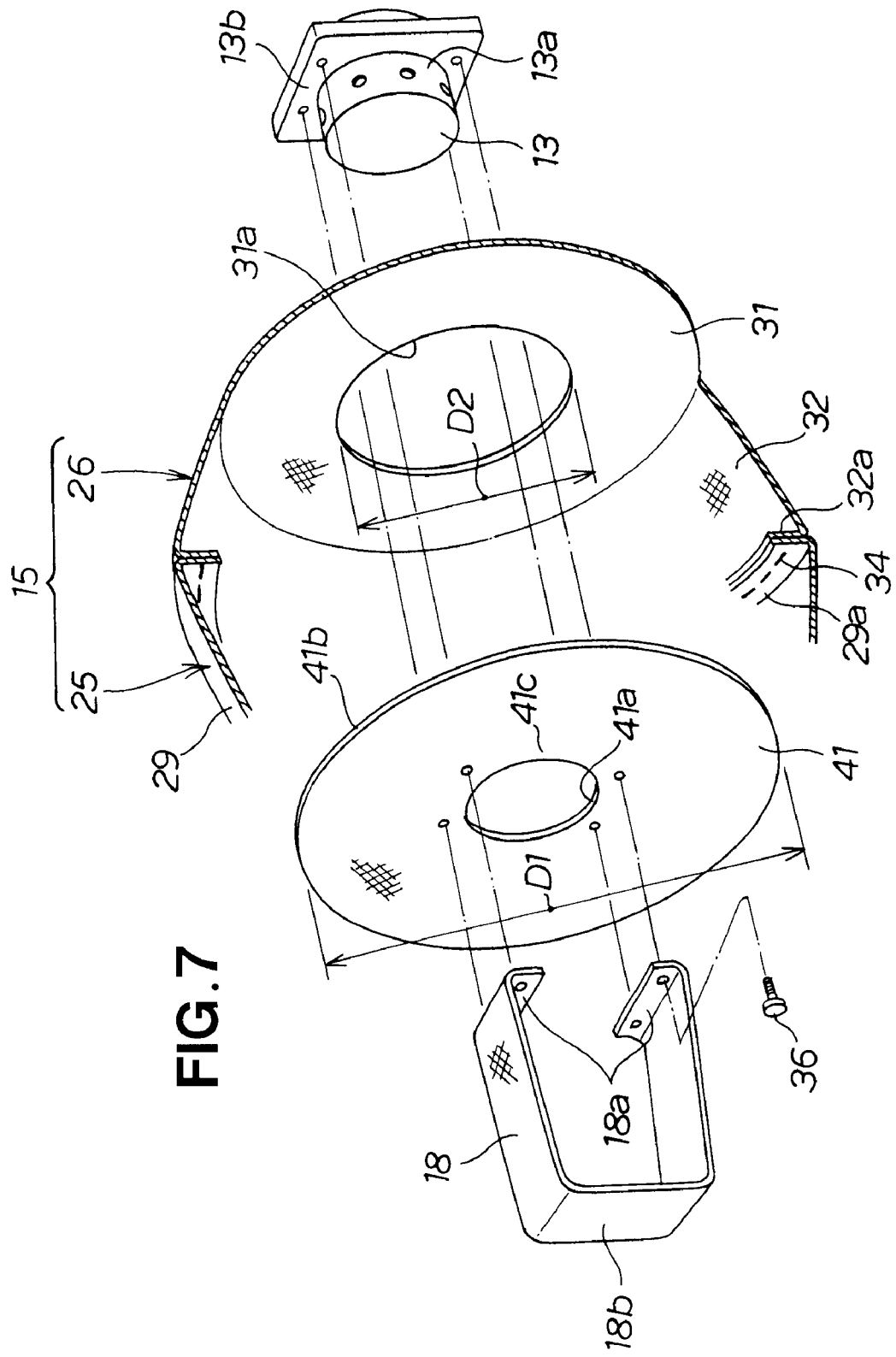
FIG. 7 is an exploded perspective view showing the second embodiment of the airbag apparatus with the airbag deployed to the occupant restraining configuration.
Figure 8:
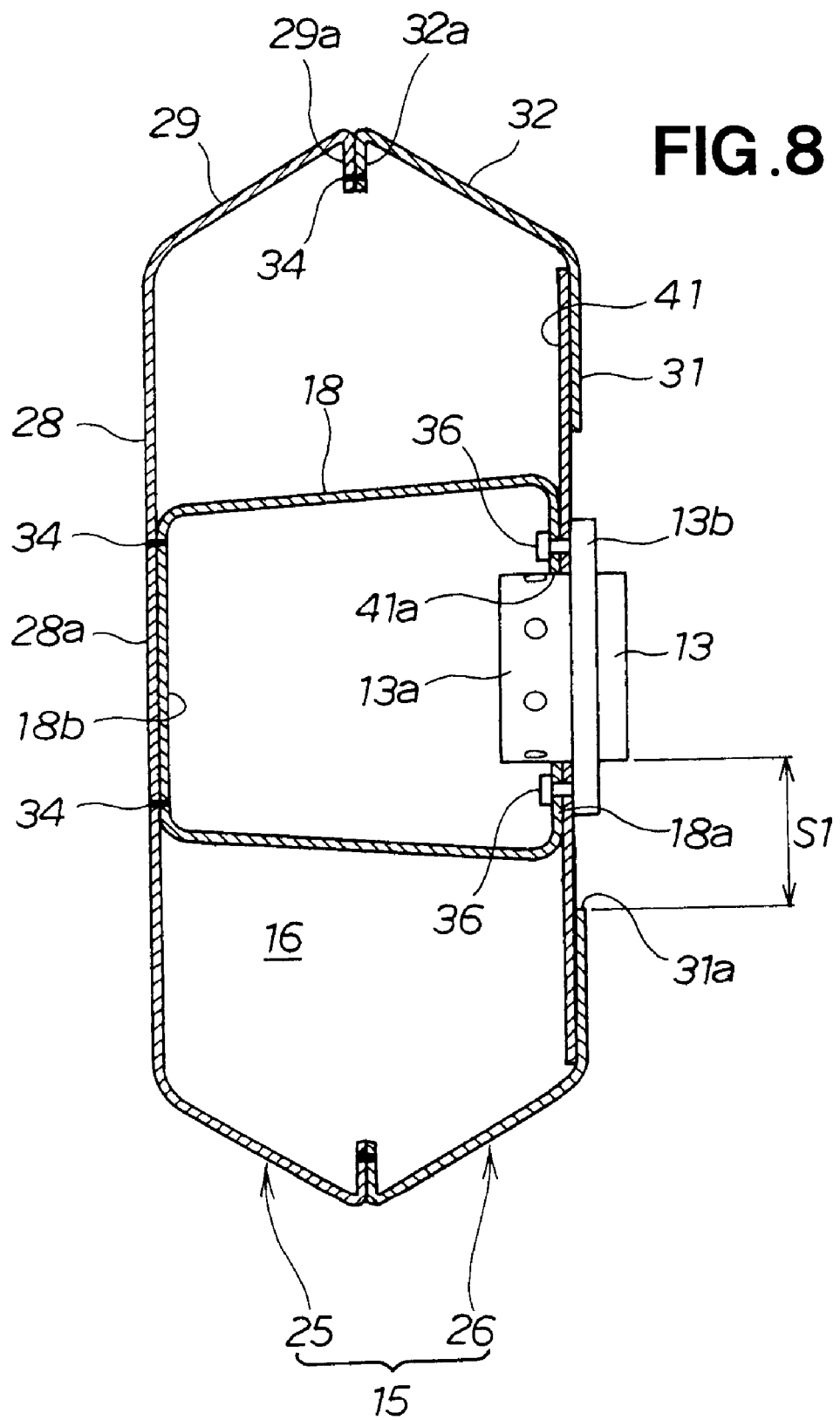
FIG. 8 is a sectional view showing the second embodiment of the airbag apparatus with the airbag deployed to the occupant restraining configuration.

FIG. 6 is a perspective view showing the second embodiment of the airbag apparatus 40 of the present invention deployed to the occupant restraining configuration. The second embodiment of the airbag apparatus 40 is similar in construction to the first embodiment of the airbag apparatus 10, except that it includes a fabric member 41 in place of the fabric member 21 and connecting fabric 23 employed in the first embodiment. FIGS. 7 and 8 are an exploded perspective view and sectional view, respectively, showing the second embodiment of the airbag apparatus 40 deployed to the occupant restraining configuration.

The fabric member 41 is an annular fabric that is fittable over the distal end portion 13a of the inflator 13. The fabric member 41 has a diameter D1 greater than the diameter D2 of the opening portion 31a of the back fabric body 31. The fabric member 41 is fastened, together with the opposite ends 18a of the tether 18, to the flange 13b of the inflator 13 by means of the screws or bolts 36 with a fitting opening portion 41a fitted over the inflator 13. Under the aforementioned condition, the fabric member 41 is superposed on the back fabric body 31 in the interior 16 of the airbag 15. Thus, the predetermined gap S1 between the opening portion 31a and the inflator 13 can be closed with the fabric member 41.

Figure 10:
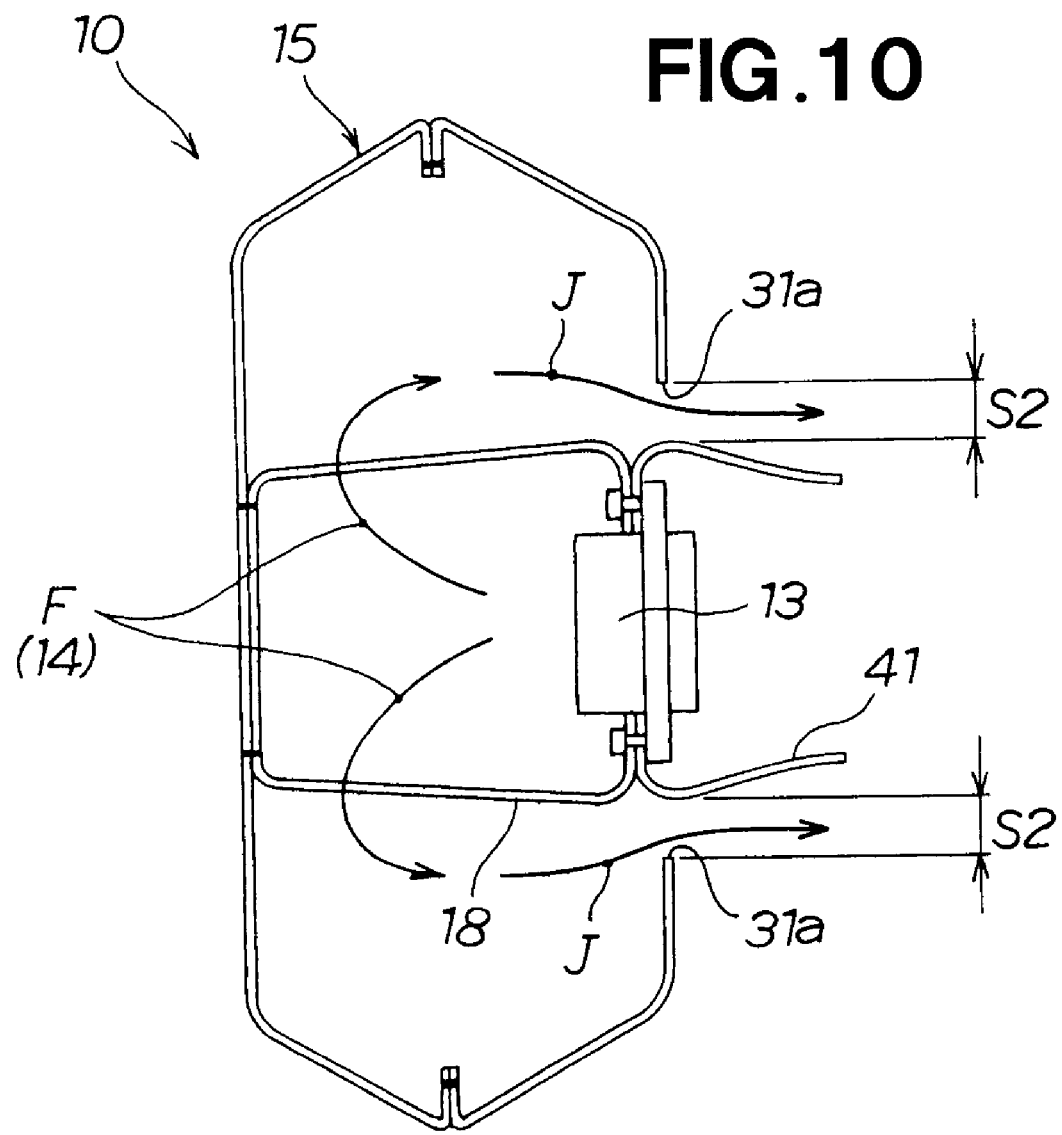
FIG. 10 is a view explanatory of how the gas pressure in the airbag is adjusted in the second embodiment of the airbag apparatus.

The following paragraphs describe an example manner in which the airbag 15 is deployed in the second embodiment of the airbag apparatus 40, with reference to FIGS. 9 and 10. FIGS. 9A and 9B are views explanatory of how the airbag 15 is deployed to the occupant restraining configuration in the second embodiment of the airbag apparatus 40.

In FIG. 9A, the gas 14 is ejected or supplied from the inflator 13 to the interior 16 of the airbag 15, as indicated in arrow F, so that the airbag 15 starts to be deployed by the supplied gas 14.

In this state, the predetermined gap S1 between the opening portion 31a and the inflator 13 is still kept closed with the fabric member 21, so that the gas 14 can be prevented from escaping out of the airbag 15. In this way, the airbag 15 can be efficiently deployed until it has taken the occupant restraining configuration capable of appropriately restraining the vehicle occupant 12 (i.e., the configuration illustrated in FIG. 9A).

In FIG. 9B, the gas 14 continues to be supplied into the airbag 15 having already been deployed to the occupant restraining configuration. With the gas 14 continuing to be supplied into the sufficiently deployed airbag 15, the gas pressure in the airbag 15 increases.

The thus-increased gas pressure acts on the back fabric body 31 as indicated by arrow G, so that the back fabric body 31 moves as indicated by arrow H and thus a gap 42 is formed between the back fabric body 31 and the fabric member 41.

In this state, the increased gas pressure acts on the fabric member 41 as indicated by arrow I, so that the fabric member 41 is pushed by the gas 14 out of the airbag 15 through the predetermined gap S1.

FIG. 10 is a view explanatory of how the gas pressure in the airbag is adjusted in the second embodiment of the airbag apparatus 40. By the fabric member 41 being pushed out of the airbag 15 through the predetermined gap S1, predetermined gaps S2 are formed between the fabric member 41 and the opening portion 31a. Thus, the gas 14 in the interior 16 of the airbag 15 can be discharged to outside the airbag 15 through the predetermined gaps S2 (and hence the opening portion 31a), as indicated by arrow J. Hence, the inner pressure of the airbag 15 can be adjusted appropriately.

When the airbag 15 is to be deployed, the second embodiment of the airbag apparatus 40 can prevent the gas 14 from escaping out of the airbag 15 by keeping the opening portion 31a closed until the airbag 15 has taken the occupant restraining configuration, as set forth above in relation to FIGS. 9-10. Consequently, the airbag 15 can be deployed to the occupant restraining configuration efficiently and stably, and thus, the amount of the gas 14 to be generated by the inflator 13 can be minimized. Namely, the second embodiment of the airbag apparatus 40 can achieve the same advantageous benefits as the first embodiment of the airbag apparatus 10.

Figure 11:
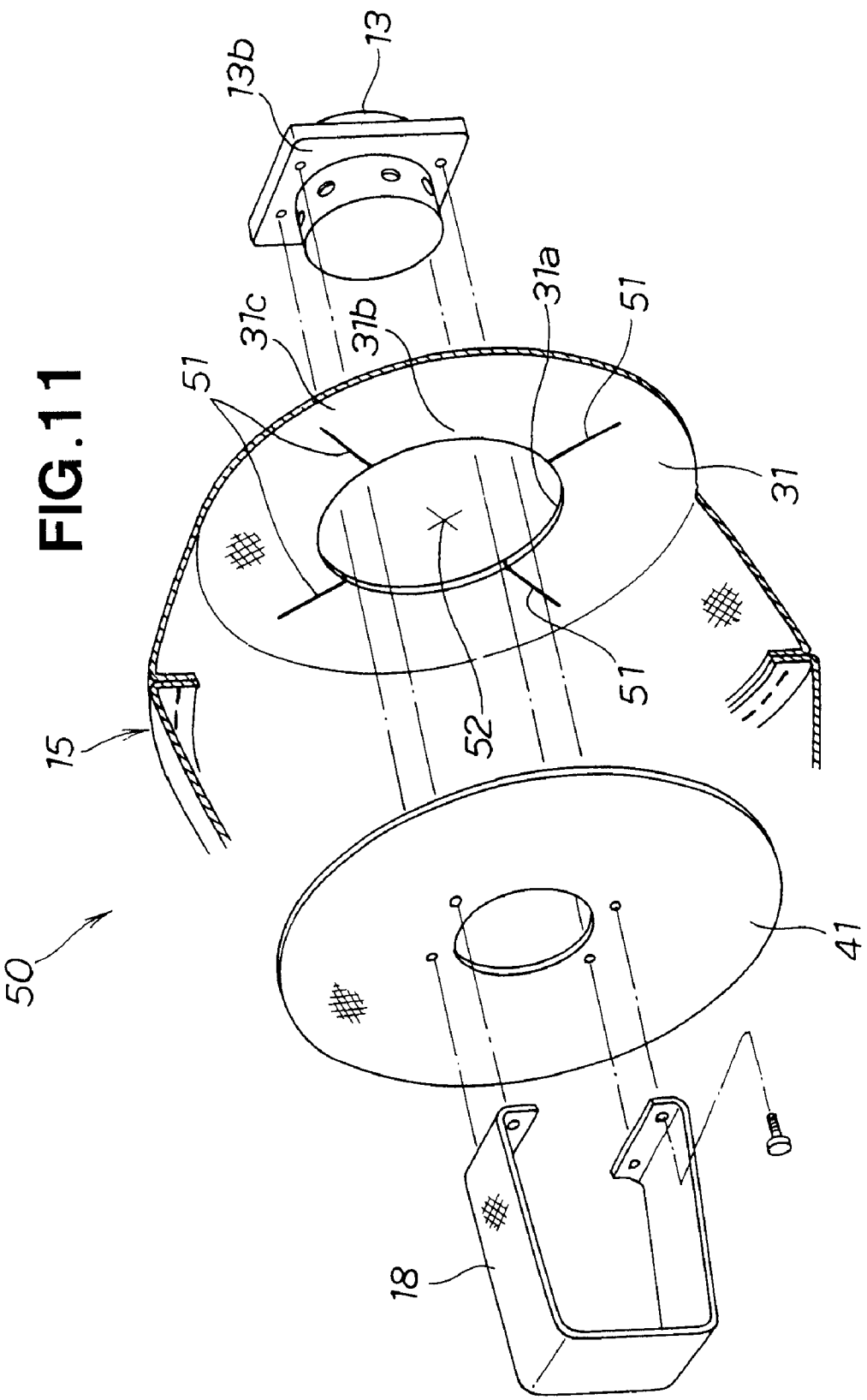
FIG. 11 is an exploded perspective view showing a third embodiment of the airbag apparatus with its airbag deployed to the occupant restraining configuration.

FIG. 11 is an exploded perspective view showing a third embodiment of the airbag apparatus 50 of the present invention with its airbag 15 deployed to the occupant restraining configuration. The third embodiment of the airbag apparatus 50 is similar in construction to the second embodiment of the airbag apparatus 40, except that it has straight slit portions 51 formed in the back fabric body 31.

The slit portions 51 are formed at an angular interval of 90 angular degrees about the center 52 of the back fabric body 31. The straight slit portions 51 extend radially outwardly from the inward end edge of the inward peripheral edge portion 31b close to the outward peripheral portion 31c. Thus, the inward peripheral edge portion 31b of the back fabric body 31 is broken by the slit portions 51.

After the airbag 51 has been deployed to the occupant restraining configuration, the slit portions 51 formed in the back fabric body 31 can be opened by the increased gas pressure. Thus, the fabric member 41 can be further pushed smoothly by the gas pressure out of the airbag 15 through the predetermined gap S1 (see FIG. 9B). In this way, the inner pressure of the airbag 15 can be adjusted even more appropriately. In addition, the third embodiment of the airbag apparatus 50 can achieve the same advantageous benefits as the second embodiment of the airbag apparatus 10.

Figure 12:
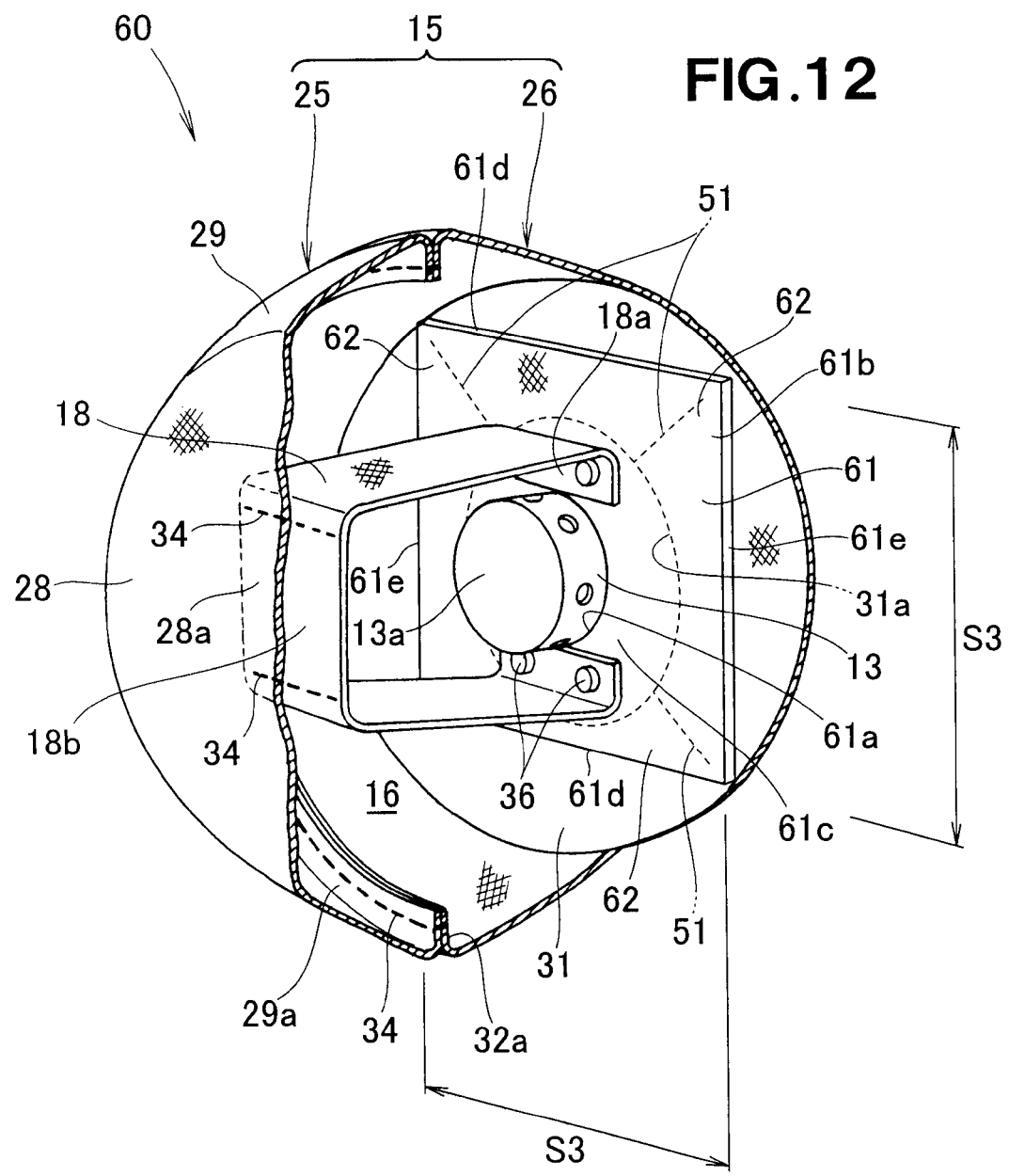
FIG. 12 is a perspective view showing a fourth embodiment of the airbag apparatus of the present invention deployed to the occupant restraining configuration.

FIG. 12 is a perspective view showing a fourth embodiment of the airbag apparatus 60 of the present invention with its airbag 15 deployed to the occupant restraining configuration. The fourth embodiment of the airbag apparatus 60 is similar in construction to the third embodiment of the airbag apparatus 50, except that it includes a fabric member 61 in place of the fabric member 41 of the third embodiment 50.

The fabric member 61 is a fabric having four radial slit portions 51, a rectangular outward periphery 61b and a circular fitting opening portion 61a formed centrally therein. The fitting opening portion 61a is fittable over the distal end portion 13a of the inflator 13 similarly to the fitting opening portion 41a of the second embodiment 40. Distance S3 between opposite sides of the fabric member 61 is greater than the diameter D2 of the opening portion 31a of the back fabric body 31.

The fabric member 61 is fastened, at its inward peripheral portion 61c of the fitting opening portion 61a, to the flange 13b of the inflator 13 by means of the screws or bolts 36 together with the opposite ends 18a of the tether 18 with the fitting opening portion 61a fitted over the inflator 13.

Under the aforementioned condition, the fabric member 61 is superposed, in a straight upright posture, on the back fabric body 31 within the airbag 15 with the upper and right sides 61d extending horizontally and the left and right sides 61e extending vertically. In this way, the predetermined gap S1 between the opening portion 31a and the inflator 13 (see FIG. 8) can be closed with the fabric member 61. Further, each of the slit portions 51 is covered with four corner portions of the fabric member 61.

Figure 14:
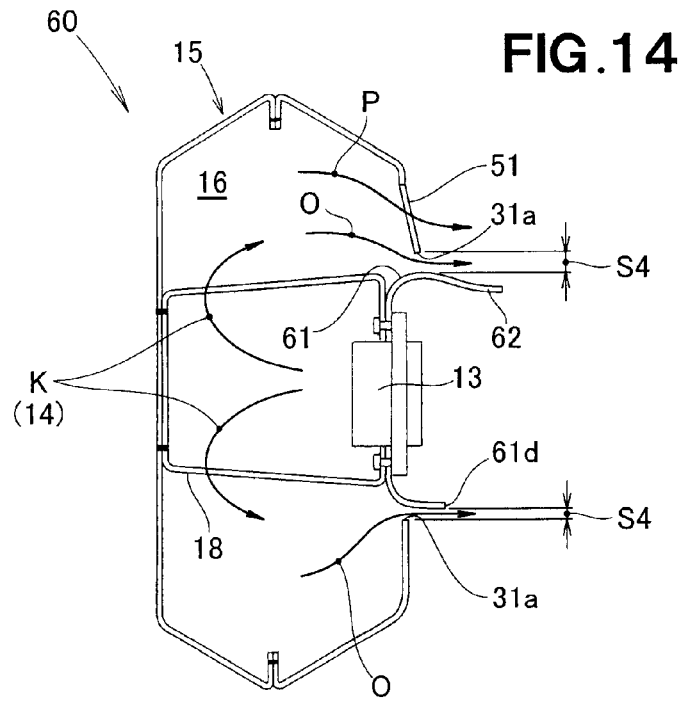
FIG. 14 is a view explanatory of how the gas pressure in the airbag is adjusted in the fourth embodiment of the airbag apparatus.

The following paragraphs describe an example manner in which the airbag 15 of the airbag apparatus 60 is deployed, with reference to FIGS. 13-14. FIGS. 13A and 13B are views explanatory of how the airbag is deployed to the occupant restraining configuration in the fourth embodiment of the airbag apparatus 60.

In FIG. 13A, the gas 14 is ejected or supplied from the inflator 13 to the interior 16 of the airbag 15, as indicated in arrow K, so that the airbag 15 starts to be deployed by the supplied gas 14.

In this state, the predetermined gap S1 between the opening portion 31a and the inflator 13 is still kept closed with the fabric member 61. With the predetermined gap S1 kept closed in the aforementioned manner, the gas 14 supplied from the inflator 13 to the interior 16 of the airbag 15 can be prevented from escaping out of the airbag 15. In this way, the airbag 15 can be efficiently deployed until it has taken the occupant restraining configuration capable of appropriately restraining the vehicle occupant 12 (i.e., configuration illustrated in the figure).

In FIG. 13B, the gas 14 continues to be supplied into the airbag 15 having already been deployed to the occupant restraining configuration. With the gas 14 continuing to be supplied into the sufficiently deployed airbag 15, the gas pressure in the airbag 15 increases.

The thus-increased gas pressure acts on the back fabric body 31 as indicated by arrow L, so that the inward peripheral portion of the back fabric body 31 moves as indicated by arrow M. By such movement of the back fabric body 31, gaps 64 and 65 are formed between the back fabric body 31 and the fabric member 61 and between the fabric member 61 and the slit portion portions 51, respectively.

The slit portions 51 formed in the fabric member 61 are opened by the gas pressure, so that the gaps 65 between the fabric member 61 and the slit portion portions 51 become greater than the gaps 64 between the back fabric body 31 and the fabric member 61.

In this state, the gas pressure acts on the fabric member 61 as indicated by arrow N, so that the fabric member 61 is pushed by the gas pressure out of the airbag 15 through the predetermined gap S1 (see FIG. 13A). Because the gaps 65 between the fabric member 61 and the slit portion portions 51 are greater than the gaps 64 between the back fabric body 31 and the fabric member 61, the corner portions 62 (see FIG. 12) are smoothly pushed outwardly of the airbag 15.

Further, because the fabric member 61 has a rectangular shape, a distance between the lower side 61d of the fabric member 61 and the inner edge of the opening portion 31a can be made small, which allows the lower side 61d to be smoothly pushed out of the airbag 15 through the predetermined gap S1 (see FIG. 13A).

FIG. 14 is a view explanatory of how the gas pressure in the airbag 15 is adjusted in the fourth embodiment of the airbag apparatus 60. By the fabric member 61 being pushed out of the airbag 15 through the predetermined gap S1 (see FIG. 13A), predetermined gaps S4 are formed between the fabric member 61 and the opening portion 31a. Thus, the gas 14 in the interior 16 of the airbag 15 can be discharged to outside the airbag 15 through the predetermined gaps S4 (and hence the opening portion 31a), as indicated by arrow O. In addition, because the slit portions 51 have been opened, the gas 14 can also be discharged to outside the airbag 15 through the opened slit portions 51 as indicated by arrow P. Hence, the inner pressure of the airbag 15 can be adjusted even more appropriately.

When the airbag 15 is to be deployed, the fourth embodiment of the airbag apparatus 60 can prevent the gas 14 from escaping out of the airbag 15 by keeping the opening portion 31a closed until the airbag 15 has taken the occupant restraining configuration, as set forth above in relation to FIGS. 13-14. Consequently, the airbag 15 can be deployed to the occupant restraining configuration efficiently and stably, and thus, the amount of the gas 14 to be generated by the inflator 13 can be minimized. Namely, the fourth embodiment of the airbag apparatus 60 can achieve the same advantageous benefits as the second embodiment of the airbag apparatus 40.

Figure 15:
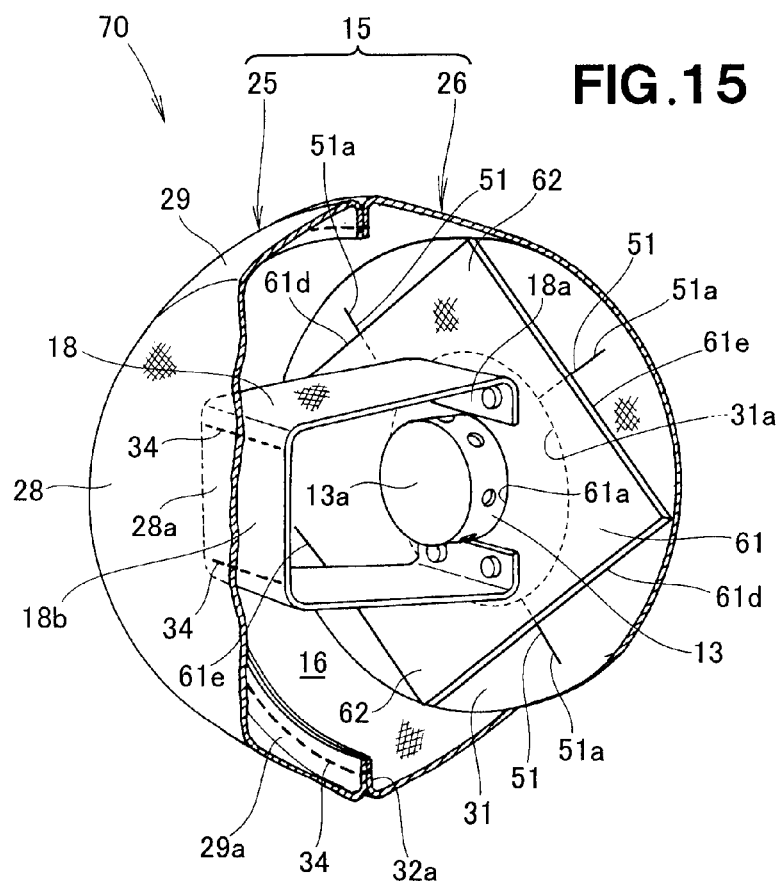
FIG. 15 is a perspective view showing a fifth embodiment of the airbag apparatus of the present invention with its airbag deployed to the occupant restraining configuration.

FIG. 15 is a perspective view showing a fifth embodiment of the airbag apparatus 70 of the present invention with its airbag 15 deployed to the occupant restraining configuration. The fifth embodiment of the airbag apparatus 70 is similar in construction to the fourth embodiment of the airbag apparatus 60, except that the fabric member 61 is angularly displaced 45 degrees relative to the fabric member 61 of the fourth embodiment.

With the fabric member 61 angularly displaced 45 degrees, the upper and lower sides 61d and the left and right sides 61e are each disposed to intersect at a right angle a substantial middle of a corresponding one of the slit portions 51. Thus, a substantial outer half of each of the slit portions 51 is exposed to the interior 16 of the airbag 15.

Hence, by adjusting the mounting angle of the fabric member 61, the gas pressure in the interior 16 of the airbag 15 can be appropriately adjusted in accordance with various different types of airbag apparatus. In addition, the fifth embodiment of the airbag apparatus 70 can achieve the same advantageous benefits as the fourth embodiment of the airbag apparatus 60.

Figure 16:
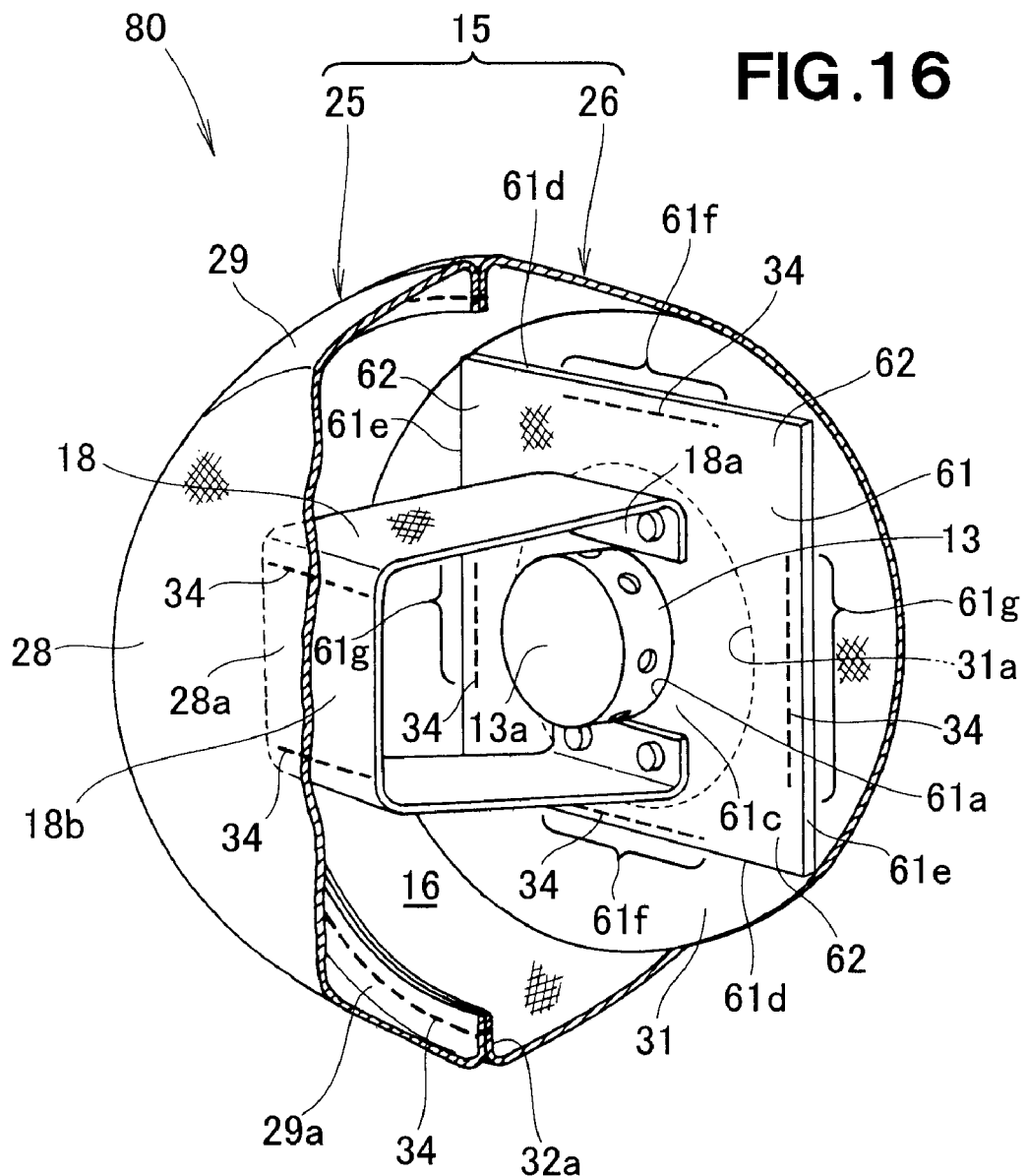
FIG. 16 is a perspective view showing a sixth embodiment of the airbag apparatus of the present invention with its airbag deployed to the occupant restraining configuration.

FIG. 16 is a perspective view showing a sixth embodiment of the airbag apparatus 80 of the present invention with its airbag 15 deployed to the occupant restraining configuration. The sixth embodiment of the airbag apparatus 80 is similar in construction to the second embodiment of the airbag apparatus 40, except that the fabric member 41 employed in the second embodiment is replaced with a fabric member 61 having portions sewn to the back fabric body 31.

The fabric member 61 is fastened, together with the opposite ends 18a of the tether 18, to the flange 13b (see FIG. 11) of the inflator 13 by means of the screws or bolts 36 with the fitting opening portion 61a fitted over the inflator 13.

The fabric member 61 is superposed, in a straight upright posture, on the back fabric body 31 within the airbag 15 with the upper and right sides 61d extending horizontally and the left and right sides 61e extending vertically. In this way, the predetermined gap S1 between the opening portion 31a and the inflator 13 (see FIG. 8) can be closed with the fabric member 61.

Under the aforementioned condition, upper and lower middle portions 61f near the upper and lower sides 61d are sewn to the back fabric body 31 by sewing threads 34, while left and right middle portions 61g near the left and right sides 61e are sewn to the back fabric body 31 by sewing threads 34. However, the four corner portions 62 of the fabric member 61 are left unsewn to the back fabric body 31.

Figure 18:
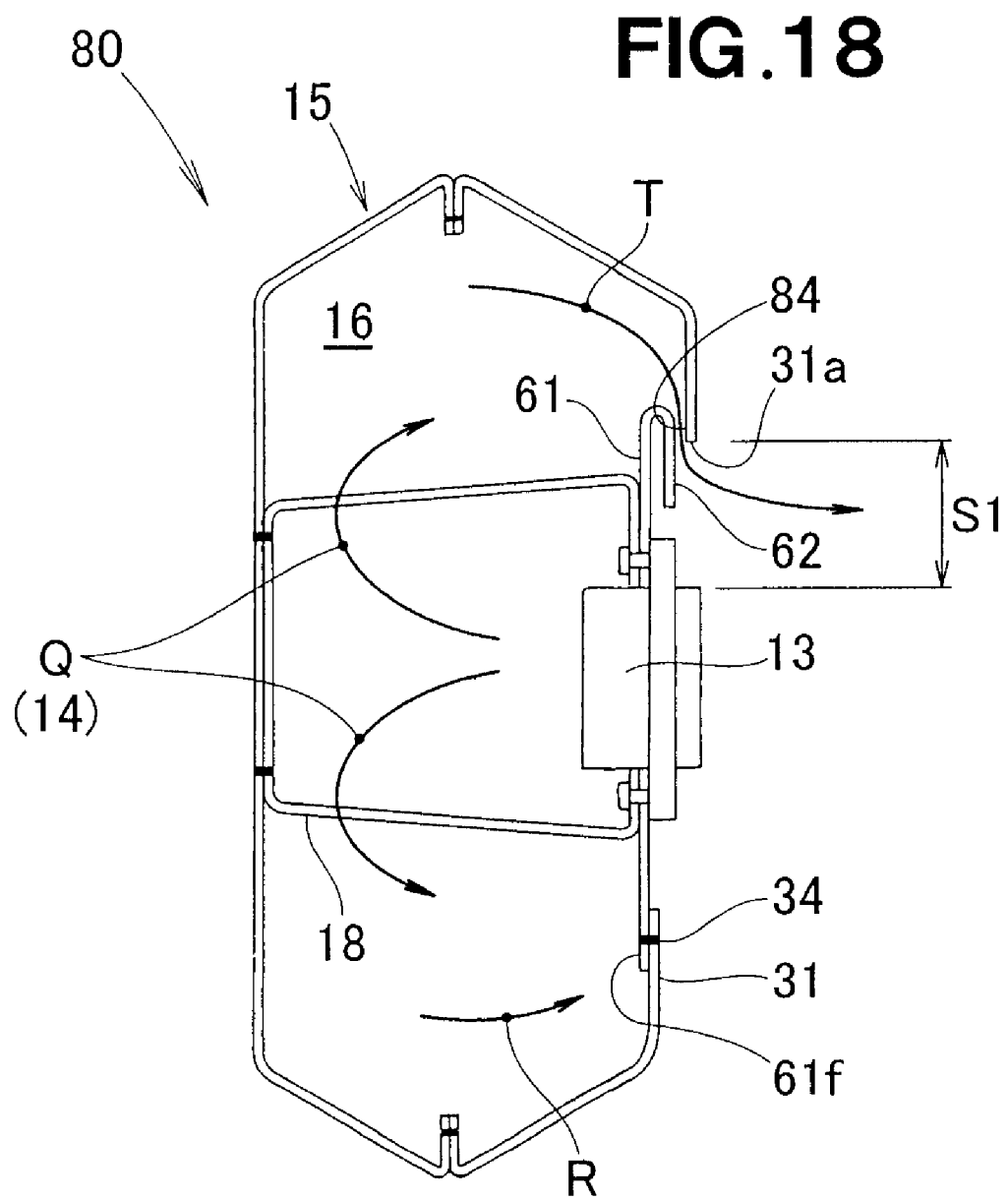
FIG. 18 is a view explanatory of how the gas pressure in the airbag is adjusted in the sixth embodiment of the airbag apparatus.

The following paragraphs describe an example manner in which the airbag 15 of the airbag apparatus 80 is deployed, with reference to FIGS. 17-18. FIGS. 17A and 17B are views explanatory of how the airbag 15 is deployed to the occupant restraining configuration in the sixth embodiment of the airbag apparatus 80.

In FIG. 17A, the gas 14 is ejected or supplied from the inflator 13 to the interior 16 of the airbag 15, as indicated in arrow Q, so that the airbag 15 starts to be deployed by the supplied gas 14.

In this state, the predetermined gap S1 between the opening portion 31a and the inflator 13 is still kept closed with the fabric member 61. With the predetermined gap S1 kept closed in the aforementioned manner, the gas 14 supplied from the inflator 13 to the interior 16 of the airbag 15 can be prevented from escaping out of the airbag 15. In this way, the airbag 15 can be efficiently deployed until it has taken the occupant restraining configuration capable of appropriately restraining the vehicle occupant 12 (i.e., configuration illustrated in the figure).

In FIG. 17B, the gas 14 continues to be supplied into the airbag 15 having already been deployed to the occupant restraining configuration. With the gas 14 continuing to be supplied into the sufficiently deployed airbag 15, the gas pressure in the airbag 15 increases.

The thus-increased gas pressure acts on the back fabric body 31 as indicated by arrow R, so that the back fabric body 31 moves as indicated by arrow S.

By such movement of the fabric body 31, a gap 82 is formed between the corner portions 62 of the inner member 61 and the back fabric body 31. The middle portions 61f near the upper and lower sides 61d and middle portions 61g near the left and right sides 61e are sewn to the fabric body 31, and no gap is formed in these sewn portions. Thus, the corner portions 62 of the inner member 61 are bent into the gap 82 and pushed outwardly of the airbag 15 through the predetermined gap S1 (see FIG. 18).

FIG. 18 is a view explanatory of how the gas pressure in the airbag is adjusted in the sixth embodiment of the airbag apparatus 80. By the corner portions 62 of the fabric member 61 being pushed outwardly of the airbag 15 through the predetermined gap S1, a predetermined gap 84 is formed between the corner portions 62 and the opening portion 31a. Thus, the gas 14 in the interior 16 of the airbag 15 can be discharged to outside the airbag 15 through the predetermined gap 84 (and hence the opening portion 31a), as indicated by arrow T. Thus, the gas pressure in the interior 16 of the airbag 15 can be appropriately adjusted with ease.

In the sixth embodiment of the airbag apparatus 80, the portions 61f and 61g of the fabric member 61 are sewn to the back fabric body 31 so that only the corner portions 62 are pushed outwardly of the airbag 15. Thus, the discharged amount of the gas 14 can be adjusted by changing the portions of the fabric member 61 to be sewn to the back fabric body 31. Hence, the gas pressure in the interior 16 of the airbag 15 can be appropriately adjusted with ease.

When the airbag 15 is to be deployed, the sixth embodiment of the airbag apparatus 80 can prevent the gas 14 from escaping out of the airbag 15 by keeping the opening portion 31a closed until the airbag 15 has taken the occupant restraining configuration, as set forth above in relation to FIGS. 17-18. Consequently, the airbag 15 can be deployed to the occupant restraining configuration efficiently and stably, and thus, the amount of the gas 14 to be generated by the inflator 13 can be minimized. In addition, the sixth embodiment of the airbag apparatus 80 can achieve the same advantageous benefits as the second embodiment of the airbag apparatus 40.

Whereas the various embodiments of the airbag apparatus 10, 40, 50, 60, 70 and 80 of the present invention have been described above as provided within the steering wheel 11, the present invention is not so limited, and the above-described embodiments of the present invention may be provided in other parts of vehicles.

The present invention is well suited for use in automotive vehicles equipped with an airbag deployable by a gas pressure of an inflator.

Obviously, various minor changes and modifications of the present invention are possible in light of the above teaching. It is therefore to be understood that within the scope of the appended claims the invention may be practiced otherwise than as specifically described.

What is claimed is:

1. An airbag apparatus for a vehicle, comprising:
   an airbag deployable by a pressure of gas ejected from an inflator upon collision of the vehicle, the airbag including front and back fabrics interconnected along respective peripheries thereof into a bag shape, the front fabric being disposed to oppose a vehicle occupant, the back fabric having an opening portion for discharging the gas, ejected from the inflator, to outside the airbag, the inflator being disposed in the opening portion of the back fabric;
   a tether connecting the front fabric to the inflator;
   a fabric member mounted to the inflator in face-to-face relation thereto and having an outward peripheral portion greater in size than the opening portion of the back fabric, the fabric member being disposed within the airbag; and
   a connecting fabric connected not only to the outward peripheral portion of the fabric member but also to an inward peripheral edge portion of the back fabric defining the opening portion, wherein the fabric member has a vent hole formed therein, and the fabric member and the connecting fabric protrude out of the airbag through the opening portion following deployment of the airbag.

2. The airbag apparatus of claim 1, wherein part of the fabric member is connected to the back fabric.

3. An airbag apparatus for a vehicle, comprising:
   an airbag deployable by a pressure of gas ejected from an inflator upon collision of the vehicle, the airbag including front and back fabrics interconnected along respective peripheries thereof into a bag shape, the front fabric being disposed to oppose a vehicle occupant, the back fabric having an opening portion for discharging the gas, ejected from the inflator, to outside the airbag, the inflator being disposed in the opening portion of the back fabric;
   a tether connecting the front fabric to the inflator; and
   a fabric member mounted to the inflator in face-to-face relation thereto and having an outward peripheral portion greater in size than the opening portion of the back fabric, the fabric member being disposed within the airbag, wherein the fabric member protrudes out of the airbag through the opening portion following deployment of the airbag.

4. The airbag apparatus of claim 3, wherein part of the fabric member is connected to the back fabric.

* * * * *